US012658000B2

(12) United States Patent
Loos et al.

(10) Patent No.: US 12,658,000 B2
(45) Date of Patent: Jun. 16, 2026

(54) COMPUTERIZED METHOD FOR OPERATING A FEATURE IN A GAME AND A SYSTEM THEREOF

(71) Applicant: Playtech Software Limited, London (GB)

(72) Inventors: Aleksei Loos, Tartu (EE); Kaido Keerma, Tartu (EE); Christopher James Delaney, Ocean Village (GI); Asaf David Bar Zakai, Tartu (EE); Anton Golovko, Tartu (EE)

(73) Assignee: Playtech Software Limited, London (GB)

( * ) Notice: Subject to any disclaimer, the term of this patent is extended or adjusted under 35 U.S.C. 154(b) by 0 days.

(21) Appl. No.: 18/797,988

(22) Filed: Aug. 8, 2024

(65) Prior Publication Data

US 2025/0006001 A1 Jan. 2, 2025

Related U.S. Application Data

(63) Continuation of application No. 17/505,242, filed on Oct. 19, 2021, now Pat. No. 12,087,134.

(60) Provisional application No. 63/093,333, filed on Oct. 19, 2020.

(51) Int. Cl.
*G07F 17/00* (2006.01)
*G07F 17/32* (2006.01)

(52) U.S. Cl.
CPC ...... *G07F 17/3255* (2013.01); *G07F 17/3223* (2013.01)

(58) Field of Classification Search
None
See application file for complete search history.

(56) References Cited

U.S. PATENT DOCUMENTS 8,616,981 B1 * 12/2013 Guinn ..................... G07F 17/34 463/31
8,672,744 B1 * 3/2014 Gronkowski ......... G07F 17/323 463/25
2002/0111209 A1 * 8/2002 Walker ................ G07F 17/3244 463/25
2003/0073494 A1 * 4/2003 Kalpakian ............... G07F 17/32 463/16

(Continued)

*Primary Examiner* — Paul A D'Agostino
(74) *Attorney, Agent, or Firm* — FisherBroyles, LLP; Roger L. Browdy; Ronni S. Jillions

(57) ABSTRACT

A computerized method of facilitating participation in a feature operation executed in a game is provided, which includes providing an aggregation platform operatively communicating with at least one remote game server (RGS). The RGS hosts at least one game to be provided to a plurality of players through players' devices. The method further comprises determining, in real time, eligibility of the plurality of players to participate in an operation of a feature shared between the players for a pre-configured event duration, wherein the shared feature operation is executed separately from the game. In response to determining that players are eligible players, facilitating their participation in the execution of the shared feature operation by iteratively selecting one eligible player as possessing a shared feature for a possession iteration having a respective possession duration, and granting an award feature to an eligible player that possesses the shared feature.

17 Claims, 6 Drawing Sheets

100

(56) References Cited

U.S. PATENT DOCUMENTS

2004/0143852 A1* 7/2004 Meyers ................. A63F 13/822 463/43
2004/0248645 A1* 12/2004 Blackburn .............. G07F 17/32 463/25
2005/0130732 A1* 6/2005 Rothschild .............. G07F 17/32 463/20
2007/0168463 A1* 7/2007 Rothschild ............. G06Q 10/10 709/217
2009/0191942 A1* 7/2009 Bennett ............... G07F 17/3288 463/20
2009/0249282 A1* 10/2009 Meijer ...................... G06F 8/36 717/106
2011/0136569 A1* 6/2011 Gura ....................... G07F 17/32 463/29
2011/0159966 A1* 6/2011 Gura ................... G07F 17/3223 463/42
2012/0028697 A1* 2/2012 Malt ................... G07F 17/3272 463/20
2012/0077579 A1* 3/2012 Apirian ............... G07F 17/3211 463/29
2013/0065691 A1* 3/2013 Gavish .................... G06F 9/542 463/40
2013/0079110 A1* 3/2013 Nicely ................ G07F 17/3272 463/25
2013/0109463 A1* 5/2013 Cahill ..................... G07F 17/32 463/27
2013/0122991 A1* 5/2013 Malt ................... G07F 17/3244 463/20
2013/0260861 A1* 10/2013 Vann ....................... G07F 17/34 463/20
2013/0260868 A1* 10/2013 Caputo ............... G07F 17/3211 463/25
2013/0296010 A1* 11/2013 Berman .............. G07F 17/3293 463/13
2015/0228159 A1* 8/2015 Meyer ..................... G07F 17/34 463/20
2019/0351332 A1* 11/2019 Sucharov ................ A63F 13/77

* cited by examiner

COMPUTERIZED METHOD FOR OPERATING A FEATURE IN A GAME AND A SYSTEM THEREOF

TECHNICAL FIELD

The presently disclosed subject matter relates to computerized gaming systems, and more particularly to a method of facilitating participation in a feature operation event.

BACKGROUND

Known gaming environments involve a large number of separate entities, operating and communicating through a complex network and architecture. Content, such as games, is created by a content creator or content provider, and is hosted on Remote Gaming Servers (RGSs) around the world. A game can be hosted on several RGSs. A licensee of a casino, also to be referred to herein as an operator, can choose to operate one or more games by adding them to the operator's portfolio, while the games themselves are stored on a single RGS or multiple RGSs. Players' devices can communicate with external systems, such as backend and management systems of the licensee operators, player management systems, various analytic systems, and wallet management systems. Considering the large number of separate entities operating in the gaming environment, it is required to enable suitable services to the players in the various games.

GENERAL DESCRIPTION

According to one aspect of the presently disclosed subject matter there is provided a computerized method of facilitating participation in a feature operation executed in a game, comprising:

providing an aggregation platform operatively communicating with at least one remote game server (RGS), the at least one RGS hosting at least one game to be provided to a plurality of players through players' devices, by a processor of the aggregation platform:

determining, in real time, eligibility of the plurality of players to participate in an operation of a feature shared between the plurality of players for a pre-configured event duration, wherein the shared feature operation is executed separately from the at least one hosted game provided to the plurality of players; and in response to determining that at least two players of the plurality of players are eligible players for the shared feature operation, facilitating participation of the eligible players in the execution of the shared feature operation, comprising:

iteratively selecting one eligible player of the eligible players, as possessing a shared feature for a possession iteration having a respective possession duration, the possession duration shorter than the pre-configured event duration; and granting an award feature to an eligible player, that possesses the shared feature, at an end of the pre-configured event duration.

In addition to the above features, the system according to this aspect of the presently disclosed subject matter can comprise one or more of features (i) to (xiii) listed below, in any desired combination or permutation which is technically possible:

(i). Determining, in real time, eligibility of a player of the plurality of players comprises:

determining an active status of the player; and in response to determining that the player has an active status, determining that the player is eligible.

(ii). Determining, in real time, the eligibility of a player of the plurality of players, comprises:

obtaining data pertaining to historic actions of the player over a pre-defined period of time; and determining the eligibility of the player based at least on the obtained data.

(iii). Facilitating the participation further comprises:

determining, based at least on the pre-configured event duration and a number of eligible players, a succession of at least two possession iterations, each possession iteration having a respective possession duration; and iteratively indicating, for each determined possession iteration of the succession, one eligible player of the eligible players as possessing the shared feature for the respective possession duration.

(iv). The computerized method further comprising:

repeatedly determining, in real time, during the pre-configured event duration, the eligibility of the plurality of players;

in response to determining that a player that was determined to be ineligible, is eligible, facilitating participation of the eligible player in the execution of the shared feature operation; and in response to determining, that an eligible player is an ineligible player, discontinue participation of the ineligible player in the shared feature operation.

(v). facilitating the participation further comprises:

determining, based at least on the pre-configured event duration and a number of eligible players, a succession of at least two possession iterations, each possession iteration having a respective possession duration; and iteratively, indicating for each determined possession iteration of the succession, one eligible player of the eligible players as possessing the shared feature for the respective possession duration;

the computerized method further comprising:

determining that the number of eligible players has been changed;

determining, based at least on the pre-configured event duration and the changed number of eligible players, a revised succession of at least two possession iterations; and iteratively selecting, for each determined possession iteration of the revised succession, one eligible player of the eligible players as possessing the shared feature for the respective possession duration.

(vi). The computerized method further comprising:

obtaining a number of available interim award features, wherein interim award features are granted to eligible players during the shared feature operation; and determining the revised succession based also on the obtained number of available interim award features.

(vii). Repeatedly determining the eligibility of a player of the plurality of players, comprises, for a player of the plurality of players:

obtaining data pertaining to historic actions of the player during the pre-configured event duration; and determining the eligibility of the player based at least on the obtained data.

(viii). The computerized method further comprising:

filtering, according to a pre-defined criterion, at least one historic action; and repeatedly determining the eligibility based on the obtained data without the at least one filtered historic action.

(ix). The shared feature operation comprises a plurality of possession iterations, each possession iteration having a respective related data, the related data comprises at least a possession duration and a plurality of eligible players participating in the possession iteration, and wherein at least part of the related data of at least one or more of the possession iterations is dynamically determined during the pre-configured event duration, based at least on the pre-configured event duration and a current number of eligible players, the computerized method further comprising:

during execution of a current possession iteration of the plurality of possession iterations, determining related data that pertains to a next possession iteration; and based on the determined related data, indicating one eligible player as possessing the shared feature in the next possession iteration for the determined next possession duration.

(x). Dynamically determining the related data is done based also on an obtained number of remaining interim award features, wherein interim award features are granted to eligible players during the shared feature operation.

(xi). The computerized method further comprising:

calculating a processing time that pertains to determining the related data of the next possession duration; and initiating determining the related data that pertains to the next possession duration, based on the calculated processing time, thereby facilitating near real-time feature operation execution.

(xii). Calculating the processing time is based on one or more of system load, network latency, a number of active players, historic actions of the active players, or a combination thereof.

(xiii). The computerized method further comprising:

based at least on the pre-configured event duration and a number of available interim award features, determining, for each of the available interim award features, a respective time, during the feature operation, for granting the available interim award feature; and at the respective time, granting the interim award feature to an eligible player that possesses the shared feature.

According to another aspect of the presently disclosed subject matter there is provided a computerized system of facilitating participation in a feature operation executed in a game, the system comprising a processing and memory circuitry (PMC) configured to:

provide an aggregation platform operatively communicating with at least one remote game server (RGS), the at least one RGS hosting at least one game to be provided to a plurality of players through players' devices, by a processor of the aggregation platform:

determine, in real time, eligibility of the plurality of players to participate in an operation of a feature shared between the plurality of players for a pre-configured event duration, wherein the shared feature operation is executed separately from the at least one hosted game provided to the plurality of players; and in response to determining that at least two players of the plurality of players are eligible players for the shared feature operation, facilitate participation of the eligible players in the execution of the shared feature operation, comprising:

iteratively, selecting one eligible player of the eligible players, as possessing a shared feature for a possession iteration having a respective possession duration, the possession duration shorter than the pre-configured event duration; and granting an award feature to an eligible player, that possesses the shared feature, at an end of the pre-configured event duration.

According to another aspect of the presently disclosed subject matter there is provided a non-transitory computer readable storage medium tangibly embodying a program of instructions that, when executed by a computer, cause the computer to perform a method of facilitating participation in a feature operation executed in a game, comprising:

providing an aggregation platform operatively communicating with at least one remote game server (RGS), the at least one RGS hosting at least one game to be provided to a plurality of players through players' devices, by a processor of the aggregation platform:

determining, in real time, eligibility of the plurality of players to participate in an operation of a feature shared between the plurality of players for a pre-configured event duration, wherein the shared feature operation is executed separately from the at least one hosted game provided to the plurality of players; and in response to determining that at least two players of the plurality of players are eligible players for the shared feature operation, facilitating participation of the eligible players in the execution of the shared feature operation, comprising:

iteratively selecting one eligible player of the eligible players, as possessing a shared feature for a possession iteration having a respective possession duration, the possession duration shorter than the pre-configured event duration; and granting an award feature to an eligible player, that possesses the shared feature, at an end of the pre-configured event duration.

The system and the non-transitory computer readable storage medium disclosed in accordance with the aspects of the presently disclosed subject matter detailed above can optionally comprise one or more of features (i) to (xiii) listed above with respect to the computerized method, mutatis mutandis, in any technically possible combination or permutation.

According to another aspect of the presently disclosed subject matter there is provided, on a player's device, a computerized method of facilitating participation in a feature operation executed in a game, comprising:

in an aggregation platform operatively communicating with at least one remote game server (RGS), the at least one RGS hosting at least one game to be provided to a plurality of players through players' devices, by a processor of the player's device:

receiving an input from a player operating the player's device to initiate an execution of a selected game from the at least one game;

initiating the selected game;

receiving, in real time, an indication, from the aggregation platform of eligibility of the player to participate in an operation of a feature shared between the plurality of players for a pre-configured event duration, wherein the shared feature operation is executed separately from the selected game, and includes iteratively selecting one eligible player of the eligible players, as possessing a shared feature for a possession iteration having a respective possession duration, the possession duration shorter than the pre-configured event duration, wherein an award is granted to an eligible player, that possesses the shared feature, at an end of the pre-configured event duration; and facilitating participation of the player in the execution of the shared feature operation, comprising:

repeatedly receiving from the aggregation platform data which pertains to the execution of the shared feature operation, the data indicative of a current player of the plurality of players that possesses the shared feature for a current possession iteration; and displaying data which pertains to the received data.

In addition to the above features, the computerized method according to this aspect of the presently disclosed subject matter can comprise one or more of features (XIV) to (XV) listed below, in any desired combination or permutation which is technically possible:

(xiv). The computerized method further comprising:

receiving from the aggregation platform a possession indication of the player as possessing the shared feature for a possession iteration having a respective possession duration;

displaying data indicative of the possession indication for the respective possession duration; and in response to possessing the shared feature by the player, at an end of the pre-configured event duration, receiving an award indication from the aggregation platform of an award granted to the player.

(xv). Receiving the input from the player further comprising receiving indication of a monetary action performed by the player, the computerized method further comprising:

determining, based on the received indication, the eligibility of the player to participate in the shared feature operation, and displaying data pertaining to the eligibility;

receiving, in real time, from the aggregation platform, an eligibility indication of eligibility or ineligibility of the player to participate in the shared feature operation;

in response to the player being eligible to participate in the shared feature operation, facilitating the participation of the eligible player in the execution of the shared feature operation; and in response to the player being ineligible to participate in the shared feature operation, discontinuing participation of the ineligible player in the shared feature operation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
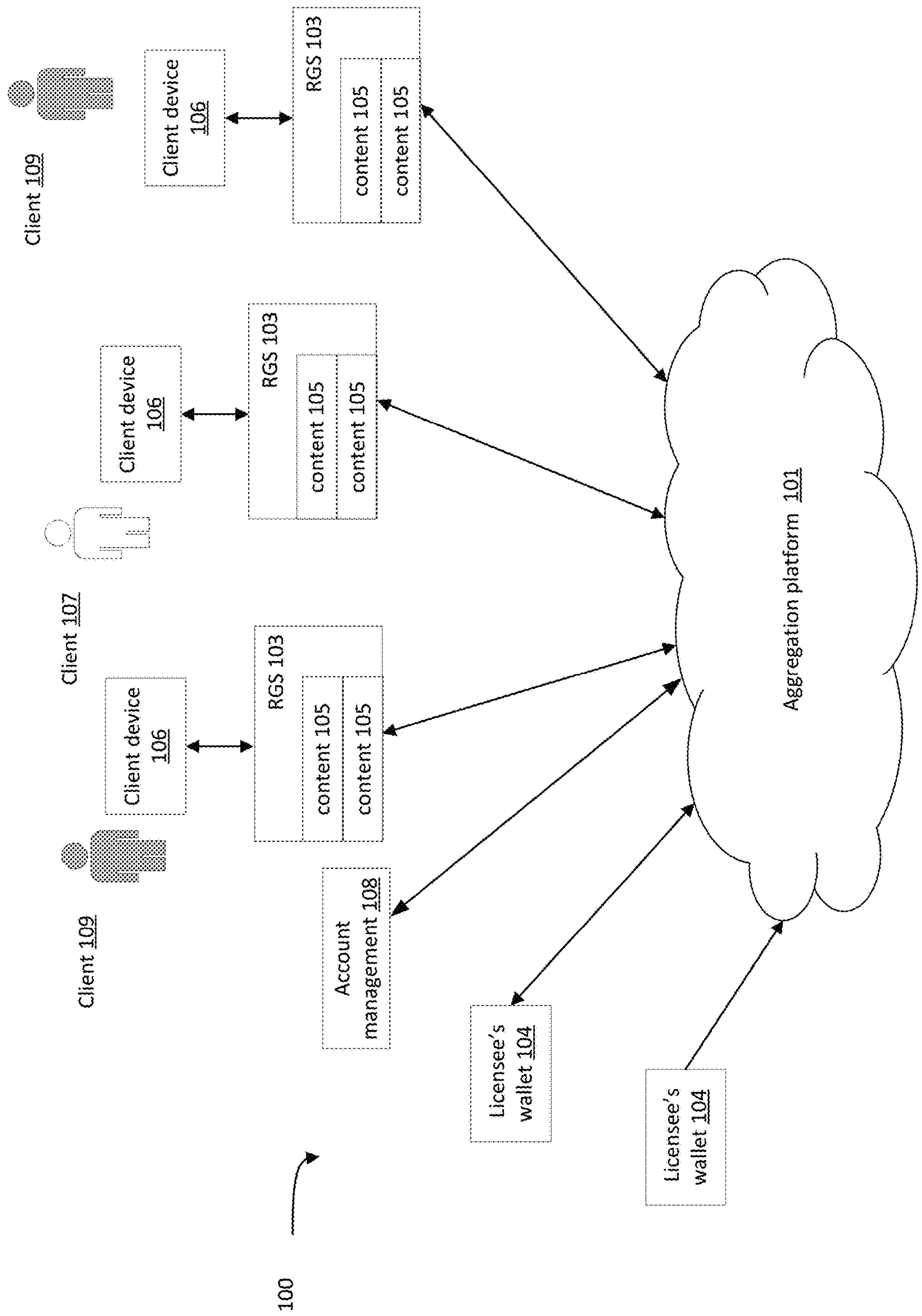
FIG. 1 illustrates a generalized diagram of a computerized gaming environment 100 in accordance with certain embodiments of the currently presented subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, and unless specifically stated otherwise, it is appreciated that throughout the specification discussions utilizing terms such as "communicating", "hosting", "determining", "transmitting", "facilitating", "participating", "providing", "calculating", "indicating", "granting", "obtaining", "filtering", "initiating", "receiving", "displaying", "transitioning", "distributing", "monitoring", "discontinuing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the aggregation platform and gaming system disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose by a computer program stored in a non-transitory computer-readable storage medium.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Various gaming systems can operate in a gaming environment. A gaming system can aggregate several games in terms of managing the players' gaming activity in the games played by the players. The gaming system can include a platform aggregating the games and can provide the platform to the players, such that the players choose a game to play from the platform. In some cases, the platform aggregating the games can offer and provide the players with various features in games, e.g. in-game options and/or out-game options, such as bonuses offering to be operated in games, based on the player's activity in the games. Tracking the user's activity in several games hosted by Remote Gaming Servers (RGSs), and aggregating the data at a higher level than the RGSs hosting the particular games, enables an aggregation platform that aggregates the data, to provide additional services to the player, which may be spread to several games, but may be executed separately from the hosted games provided. Hence, in some cases, the gaming platform can operate a feature event, during which a feature is shared between several players playing games. A feature event can be pre-configured to be associated with one or more games, such that the feature event may be operated when the associated one or more games are active and played by players. The players can play the same game on the same RGS, or can play different games on a plurality of RGSs, while sharing the same feature. The feature shared between the players in the different games can be operated simultaneously, yet independently, of the games that are played by the players. Hence, in cases where several games are associated with a single shared feature, a player can switch between the several games and play each game for a certain duration, and simultaneously, if the player is determined to meet the eligibility criteria, the same feature event can be operated in the several games, irrespective of the game played by the player.

Bearing this in mind, attention is drawn to FIG. 1 illustrating a generalized diagram of a computerized gaming environment 100 in accordance with certain embodiments of the currently presented subject matter. The computerized gaming environment 100 comprises an aggregation platform 101 that is operatively connected to one or more Remote Gaming Servers (RGSs) 103 each hosting one or more content pieces 105. A content piece can be a game (referred to herein also as game 105). The game can be provided to a client 107, e.g. a player of a game (referred to herein also as player 107), through client's device 106 (referred to herein also as a player's device 106). Some of the clients are denoted by clients 109 (also to be referred to as eligible players 109). Eligible players 109 are players from among all players 107 that were determined to be eligible and are entitled to participate in a shared feature operation. The determination on the eligibility of players is further described below.

The aggregation platform 101 is further operatively connected to several instances of a licensee's wallet 104 and to account management 108. A licensee's wallet 104 can be a wallet application providing monetary services to plurality of players 107 through players' devices 106. Account management 108 can be an application managing client's accounts and details pertaining to players accounts. Account management 108 can communicate with feature client API service 260 and transmit data on players accounts e.g. providing authentication details of a player, when required.

In some cases, the aggregation platform 101 is configured to aggregate the plurality of games 105 hosted by the RGSs 103. The games 105 can be played by a plurality of players 107. Aggregation platform 101 is configured to manage the gaming activity in the games 105, while providing gaming services, content and features to the players 107, and providing gaming services to operators of games 105. In some examples, the aggregation platform 101 is configured to operate one or more shared feature to multiple players 107 through players' devices 106. For example, each RGS 103 can host one or more games 105. Players 107 can play games 105 on RGS 103. Aggregation platform 101 is configured to operate a shared feature event, during which a feature is shared between the players 107, through players' devices 106 for a pre-configured duration of event time. For example, the shared feature can be a digital parcel virtually passed between the players 107 while they play their games 105 through the players' devices 106. For example, the parcel can virtually be transitioned between the players for a pre-configured parcel event duration. The parcel is transitioned between the players in an iterative manner, such that each player possesses the parcel for a certain time interval from the parcel event duration. An award can be granted to a player that is in current possession of the parcel at the end of the parcel event duration. For example, the award can be a bonus feature, or a physical prize sent to the player. In some cases, aggregation platform 101 is configured to share the feature only between players 107 that are determined to be eligible for participation in the shared feature event. The eligible players from among all players 107 are denoted in FIG. 1 by players 109. The aggregation platform 101 is configured to repeatedly monitor and determine the eligibility of the players 107 and eligible players 109 and to determine any change in their eligibility status. Hence, a player 109 that was determined to be eligible, can be determined at a later point in time to be ineligible. The eligibility to participate in the shared feature event, as well as the continuous determination of the eligibility is further described below with respect to FIG. 3. Handling the operation of the shared feature event by aggregation platform 101 in the plurality of games 105 is advantageous, as it enables one or more operators (licensees) of games 105 to share a feature, e.g. a promotional feature or a bonus, in games 105 operated by several licensees and hosted by a plurality of RGSs 103.

Figure 2:
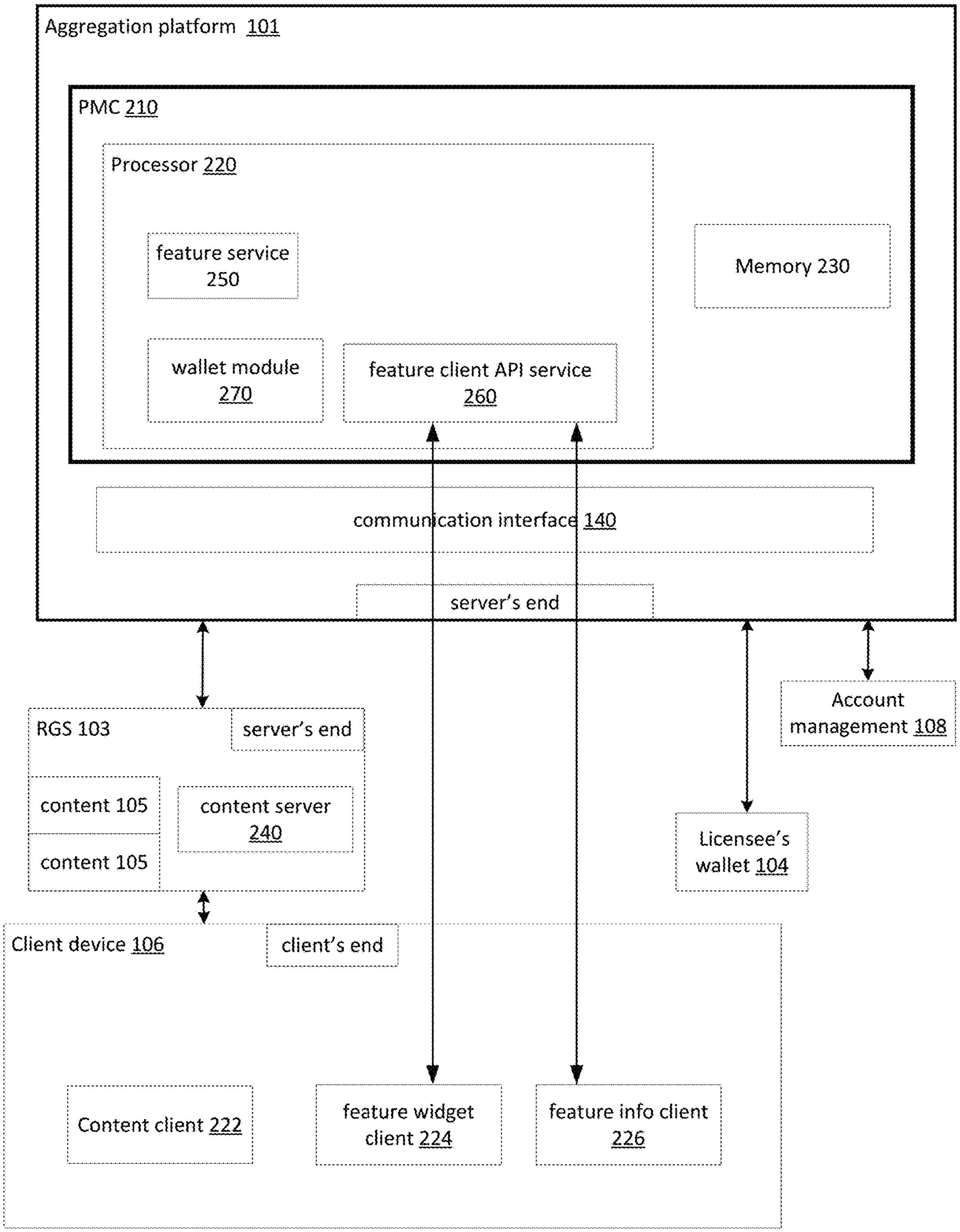
FIG. 2 illustrates a functional block diagram of elements of computerized gaming environment 100, in accordance with certain embodiments of the presently disclosed subject matter.

Reference is now made to FIG. 2 illustrating a functional block diagram of elements of computerized gaming environment 100, in accordance with certain embodiments of the presently disclosed subject matter. An aggregation platform 101 can comprise a processor and memory circuitry (PMC) 210 comprising a processor 220 and a memory 230. The processor 220 is configured to execute several functional modules in accordance with computer-readable instructions implemented on a non-transitory computer-readable storage medium e.g. memory 230. Such functional modules are referred to hereinafter as comprised in the processor 220. The processor 220 can comprise feature service 250, feature client API service 260 and wallet module 270. Feature service 250 is configured to manage feature events and coordinate activities pertaining to the feature events, including determining, in real time (or near real time), the eligibility of the plurality of players 107 to participate in an operation of a feature shared between the players, facilitating the participation of the eligible players 109, repeatedly determining, in real time, during a pre-configured feature event duration the eligibility of the plurality of players, to change their eligibility status and to facilitate their operation in the shared feature accordingly, to configure and manage the transition of the feature between the eligible players, and receive connection data on the shared feature event to clients' devices 106, e.g. through feature client API service 260.

Feature Client API Service 260 may constitute a client-facing connection endpoint to manage data distribution from feature Service 250 to connected players 107 and eligible players 109. Feature client API service 260 is configured to communicate with a players' device 106, e.g. using communication interface 140, and to constitute the server's end functionality in the operation of the shared feature event. Feature client API service 260 is configured to receive connection data from the players' device 106 which pertains to operation of the feature at the player's device. For example, player's device 106 can communicate to feature client API service 260 that a player 107 is active in a game and that the feature widget at the client's device 106 operates. Feature client API service 260 can communicate the received data to feature service 250, which can determine, based on the received data, that the player 107 is now active.

Wallet module 270 is configured to manage a player's monetary balances, and to communicate, in some examples, with one or more external wallet applications, e.g. licensee's wallet 104, in cases where a player's account monetary balance management is handled by an external system. External licensee's wallet 104 may be used to provide to wallet module 270 data indicative of the players' balance, and to verify or deny deposits or withdrawals. For example, external licensee's wallet 104 may verify to wallet module 270 that a player placed a bet of a certain amount in the last hour. Wallet module 270 may communicate the received verification to Feature Service 250.

Memory 230 can store data which pertains to the games 105, operation of shared features event, the association of feature events and games e.g. if a feature event is associated with one or more games, pre-configured data pertaining to each feature event including e.g. the awards in each feature event, etc.

Aggregation platform 101 further comprises communication interface 140 enabling the aggregation platform 101 to operatively communicate with other entities in environment 100, such as with at least one RGS 103, licensee's wallet 104, or account management 108.

RGS 103 may include one or more games 105 and a content server 240. Content server 240 may handle gameplay activity from the server's end, including e.g. executing operations such as generating results from game engines, and transmitting data to wallet module 270 in PMC 210, such as a player that initiated a gameplay, resulting in potential initiation of the shared feature operation from the server's end by PMC 210.

Player's device 106 may constitute the client's end functionality in the operation of the shared feature event and is configured to communicate both with RGS 103 for enabling the operation of the game 105 hosted by RGS 103 and with aggregation platform 101 e.g. by receiving data from feature client API service 260 for enabling the operation of the shared feature on player's device 106. Player's device 106 can comprise content client 222, feature widget client 224, and feature info client 226. In some examples, content client 222 can handle some or all of the gameplay activity from the client's end and is operatively connected to Content server 240 in RGS 103. Some exemplary operations of gameplay activity include obtaining input from a player and displaying game results from Content server 240. If a game is associated with a feature event, feature widget client 224 is configured to communicate connection data to feature client API service 260 to indicate that the widget is active. During the gameplay, feature widget client 224 is configured to continue and communicate connection data to feature client API service 260 to indicative whether the widget is still active. As described above, the data may be communicated to feature service 250 and can be used by the feature service 250 to determine that the player is active and is therefore eligible to participate in the shared feature operation. During gameplay activity, feature widget client 224 is configured to operate the shared feature event at the client's end and to display real-time or near real time information on feature possession information, e.g. the existence of a player that possesses the current feature, or the eligibility of a player operating the client's device 106 to receive the feature. Feature Info client 226 is configured to display information on one or more feature events, such as currently on-going or upcoming feature events. A player may select one of the displayed feature events and request to join it. The request may be communicated to feature client API service 260 and be forwarded to feature server 250. It should be noted that in order to provide games as a service (GaaS) mode of operation by aggregation platform 101, in a smooth manner, the aggregation platform 101 needs to constantly monitor player's activity, including the monetary actions of the players, during the various games 105. As such, there is constant communication of data between entities operating in environment 100, including wallet applications, that pertain to the hosted games 105 and the players actions in the games 105, including the players' monetary activity in the games.

It is noted that the teachings of the presently disclosed subject matter are not bound by the environment and block diagram described with reference to FIGS. 1 and 2. Equivalent and/or modified functionality can be consolidated or divided in another manner and can be implemented in any appropriate combination of software with firmware and/or hardware and executed on a suitable device. In certain embodiments, aggregation platform 101 can be implemented in multi-tenancy clustered architecture, so that multiple instances of each server component run across multiple server nodes, providing both resilience and scalability. The aggregation platform 101 can be a standalone network entity, or integrated, fully or partly, with other network entities. Those skilled in the art will also readily appreciate that the data repositories such as memory 230 can be consolidated or divided in other manner; databases can be shared with other systems or be provided by other systems, including third party equipment. In addition, the aggregation platform 101 can communicate with external systems, such as backend and management systems of the licensee operators, player management systems, various analytic systems, and wallet management systems.

According to certain embodiments of the presently disclosed subject matter, the aggregation platform 101 can provide players 107 with features in games 105, e.g. in-game options and/or out-game options, such as bonuses offering to be operated in various games. In some cases, aggregation platform 101 may provide a feature that is shared between a plurality of players 107 in one or more games 105 hosted by one or more RGSs 103. One example of such a shared feature can be a digital parcel virtually transitioned between players 107. In some examples, the parcel is transitioned between players 109, that were determined to be eligible for participating in the parcel event. The parcel can be transitioned between the eligible players 109 for a pre-configured event duration (e.g. parcel event duration), while they play their games 105 through the players' devices 106. For example, the parcel can virtually be transitioned between the eligible players 109 in an iterative manner, such that each eligible player 109 potentially possesses the parcel for a certain time interval from the parcel event duration. An award feature can be granted to an eligible player 109 that is in current possession of the parcel at the end of the parcel event duration.

Figure 3:
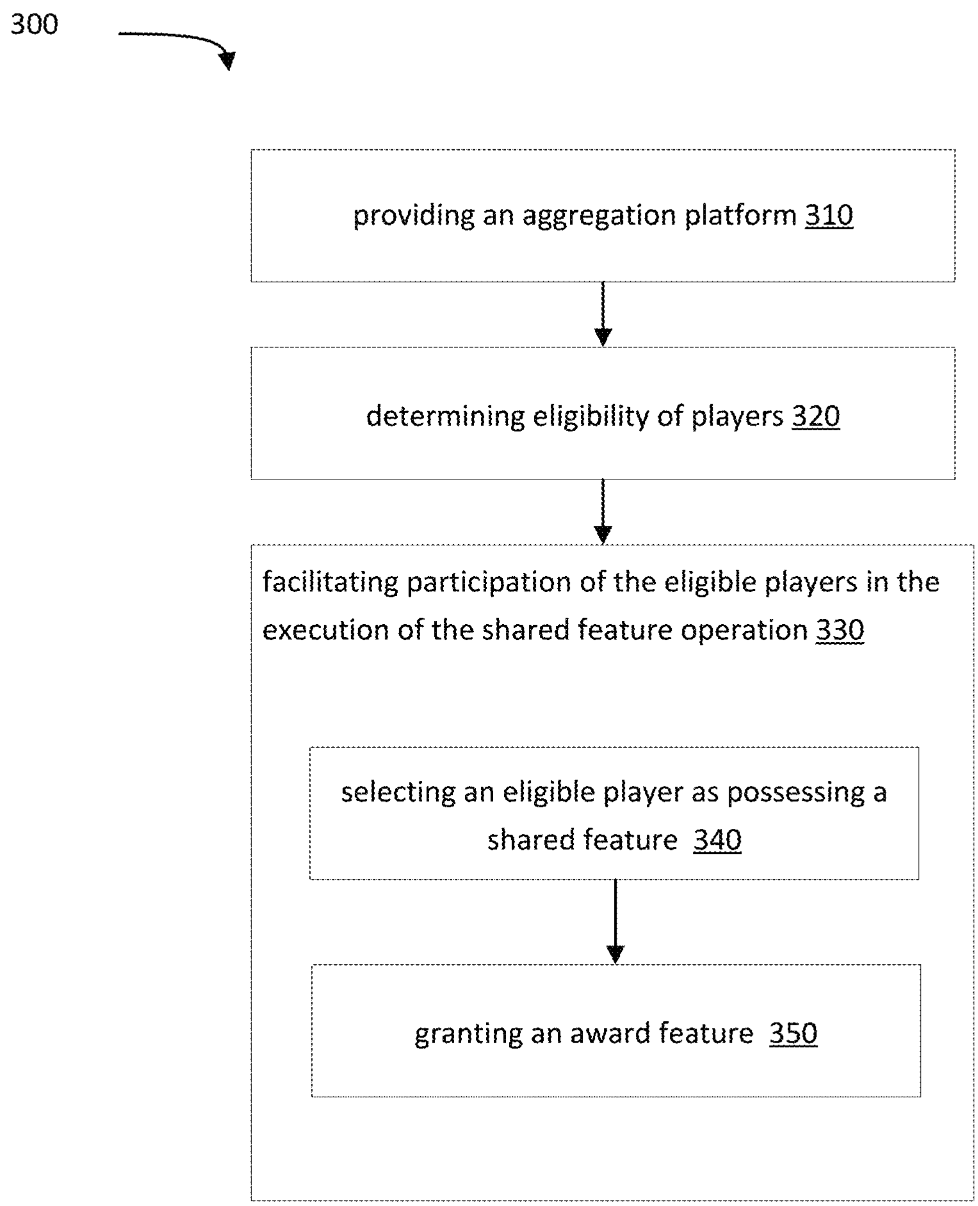
FIG. 3 illustrates a generalized flow-chart of operations performed by PMC 210 in accordance with certain embodiments of the presently disclosed subject matter.

Bearing the above in mind, reference is now made to FIG. 3 illustrating a generalized flow-chart of operations performed by PMC 210 in accordance with certain embodiments of the presently disclosed subject matter. In order to operate a shared feature between plurality of players 107, in some cases, an aggregation platform 101 is provided (block 310). The aggregation platform 101 operatively communicates with at least one RGS 103. The at least one RGS can host at least one game 105 to be provided to a plurality of players 107 through players' devices 106. The aggregation platform 101 can monitor and aggregate data pertaining to the player's activity in one or more games 105 hosted by RGSs 103. In some cases, the processor 220 in PMC 210 included in aggregation platform 101 e.g. using feature service 250, can determine, in real time (or near real time) eligibility status of the plurality of players 107 (block 320), and to determine which of all players 107 are eligible players 109, that are entitled to participate in an operation of a feature shared between them. One example of a feature that can be shared between eligible players 109 can be a digital parcel virtually passed between the players 109, while they play their games 105 through the players' devices 106. Once determined to be eligible, the eligible players 109 can be added to a list of eligible players 109 and can be stored e.g. in memory 230.

In order to determine the eligibility status of a player, aggregation platform 101 can determine criteria that the players 107 need to meet in order to be eligible and to be entitled to participate in the shared feature event. The criteria can be stored in memory 230 and be used by feature service 250 to determine the eligibility status of players. In some examples, the criteria can be determined by licensees of the games 105, and can be transmitted to the aggregation platform 101 to determine the eligibility of the players. The criteria can pertain to a player's activity and actions in a game event, in the current game 105 that the player 107 plays, and/or in another game hosted by another RGS 103. For example, one criterion can include that the player must be active in order to participate, e.g. a player has to run an active gameplay in a game 105. In order to determine an active gameplay, feature client API service 260 may receive connection data from feature widget client 224 indicating that the player 107 is active. Feature client API service 260 may transmit the data to service feature 250 which may determine, based on this data, that the player 107 is active, and is therefore eligible. Alternatively, in addition to the player 107 being active, the activity criterion may require not only that the player be active in a game, but also that a "minimum activity frequency" criterion is fulfilled. Placing a bet by a player 107 may bring the feature service 250 to determine that the player 107 as eligible for X duration of time as meeting the "minimum activity frequency" criterion. In order that feature service 250 can determine whether the player 107 meets the "minimum activity frequency" criterion, the feature service 250 may track the player's 107 staking activity at the time of execution of the gameplay. The feature service 250 may accept individual stakes placed by the player 107 once they are confirmed, e.g. by the wallet module 270. In some examples, the individual stakes may be filtered based on pre-defined criteria of the game event, e.g. filters based on the size of the bet (a "minimum single stake amount" feature that defines a minimal amount of a player's stake). Additional filters may be predefined by the game event, such as, but not limited to, low-risk stakes in roulette games. If the player's stake is accepted, and data indicative of the acceptance is received by the feature service 250, the player 107 may be marked as active by meeting the criterion of a "minimum activity frequency" from a given time onwards.

An exemplary flow for determining the active eligibility of players may include the following stages:

a. Player is connected with feature widget client 224, as received from feature widget client 224
b. Player is actively betting (staking frequency criteria), as received by wallet 270
c. Player is eligible from a staking criteria perspective (if configured), as received by wallet 270
d. Player is eligible from a deposit criteria perspective (if configured), as received by wallet 270

In some examples, if it is determined that no active players are in the game event, then the event may be moved to an idle state, during which:

a. Players may be notified with the new status (ACTIVE→IDLE)
b. Next iteration calculation may be halted
c. Next iteration calculation may be triggered again when a player becomes active and is eligible to receive the shared feature, in which case subscribed clients may be notified with the new status (IDLE→ACTIVE).

In addition, the criteria for determining eligibility of players can relate to historic actions of a player over a pre-defined period of time, e.g. during a pre-defined period of time before the player 107 initiated the gameplay in a game event, and/or during the game event. Some non-limiting examples of the criteria can pertain to monetary actions performed by the player, including "deposit criteria", according to which the criteria are considered as fulfilled if the player has deposited a configured amount of funds in his account during the game event, e.g. an amount of funds that is above a predefined deposit threshold, and "staking criteria" according to which the criteria are considered as fulfilled if the player has staked a configured amount of funds as part of the gameplay activity during the game event, e.g. an amount of funds that is above a predefined staking threshold. Deposit and staking criteria may define thresholds pertaining to the number of bets that a player has to place within a certain time duration e.g., during the last hour or week before player 107 initiated the gameplay, the total value of bets, a certain frequency that they bets were placed e.g. every 1 minute, or any combination of the criteria. To fulfill the requirements of deposit/staking criteria, the feature service 250 may monitor the total sum of deposits/staking per each player from the moment the player opts-in to the game event. If the eligibility criteria define criteria that are dependent on previous actions and bets placed by the player before the player opts-in to the game event, then data which pertains to aggregated statistics relating to the previous bets/actions of the given player, may be retrieved from an existing wallet system storage, e.g. wallet module 270 or licensee's wallet 104. If, based on the retrieved aggregated statistics, the player met the criteria, the feature service 250 may determine that the player is an eligible player 109. It should be noted that the term "criterion" as used herein should be expansively construed to include any compound criterion, including, for example, several criteria and/or their logical combinations. Also, the specific examples of criteria should not be considered as limiting, and those skilled in the art will readily appreciate that the teachings of the presently disclosed subject matter are, likewise, applicable to other criteria.

Determining the eligibility by aggregation platform 101 in real time based on the pre-configured criteria may be based on data received by the aggregation platform 101 with respect to the activity and actions performed by players 107 in the games 105. For example, PMC 210 can receive an indication from content server 240 in RGS 103 that a player 107 initiated a gameplay in a game 105 hosted by the RGS 103. Based on the received indication, feature service 230 can determine an active status of the player 107, and, in response, determine that the player 107 is eligible to participate in the shared feature operation, constituting an eligible player 109. Additionally, or alternatively, feature service 230, e.g. using wallet module 270, can obtain from licensee's wallet 104 data pertaining to historic monetary actions of the player 107 over a pre-defined period of time, to determine whether the player has met the above criteria, and, accordingly, to determine the player's eligibility status.

If one or more players 107 of the players playing the games 105 are determined to be eligible, constituting eligible players 109, PMC 210 can facilitate participation of those eligible players 109 in the execution of the shared feature operation (block 330). Before describing how facilitating the participation is done by PMC 210, it should be noted that the shared feature operation is executed separately from the one or more games 105 provided to the plurality of eligible players 109. Executing the shared feature separately from games 105 is advantageous, as the operation execution is independent of the activity and actions of the eligible player 109 in the game. Indeed, the eligibility of the player 109 to participate in the shared feature operation may be determined at least partially on his actions in the game 105, and may even be repeatedly re-determined as explained further below. However, once the player 107 is determined to be eligible, his participation in the shared feature operation is independent of the actions in the game 105, and may occur simultaneously to his gameplay in game 105. The operation of the shared feature can last for a pre-configured event duration, e.g. as set by aggregation platform 101 or by a licensee. In some examples, the shared feature event duration can be shorter than the duration of the game 105 played by the eligible player 109, and can be initiated after the eligible player 109 has already begun their gameplay. It should also be noted that in some examples the separate execution is enabled due to the operative communication between the components at the client's end of the feature operation (including content client 222, feature widget client 224 and feature info client 226) and components of the server's end in aggregation platform 101 (e.g. feature client API service 260) and with content server 240 in in RGS 103, and the independent communication of data between these components, such as the connection info sent by feature widget client 224 to feature client API service 260. The separate execution of the shared feature is further described below with respect to FIG. 4. In the example of the digital parcel, the parcel is virtually transitioned between the players 107, in an iterative manner, such that each player 107 possesses the parcel for a certain time interval, irrespective of his actions in the game 105.

In some cases, participation of eligible players 109 can be done in response to the feature service 250 determining that at least two players of the plurality of players 107 are eligible players 109 for the shared feature operation. In such cases, the shared feature can be transitioned between the eligible players 109 in an iterative manner. However, the operation can also be executed even if only one player of the plurality of players 107 is determined to be an eligible player 109, e.g. by forming a dummy player by feature service 250, to constitute the second eligible player 109, such that the shared feature can be transitioned between the eligible player 109 and the dummy player.

In some cases, the shared feature can be transitioned between players 107 that were determined to be eligible. Feature service 250 can transit the shared feature by iteratively selecting one eligible player 109 of the eligible players, as possessing a shared feature (block 340) for a possession iteration having a respective possession duration e.g. the duration of the entire feature event duration. The possession duration may be shorter than the pre-configured event duration. The duration of the possession time, which is shorter than the operation time of the shared feature, ensures that the shared feature is transitioned between the eligible players 109. Selection of the player 109 to possess the feature can be random, or can be according to a predetermined order, e.g. the order in which the eligible players 109 were determined to be eligible. Those versed in the art would realize that additional methods of determining the next possessing player of all eligible players 109 can be implemented here. Data pertaining to the operation, such as a list of all players, a list of current eligible players, current selection of the eligible player to possess the feature, can be stored in memory 230.

In some cases, operation of the shared feature can include transmitting data of the operation and/or the possession iterations to the client's device 106. Feature service 250 can transmit data, e.g. using feature client API service 260, to feature widget client 224, to be displayed on the client's device 106. The transmitted data can include data on the shared feature event and operation, the current eligible players, such as their nicknames, the current number of eligible players, data on the current possession iteration including the possession duration, and the current eligible player 109 that selected to possess the shared feature. The data from the feature service 250 may be distributed to clients' devices 106 in notification messages. Notifications messages may be player specific, so that a 1-to-1 message is sent (e.g. a player becomes eligible from a criteria perspective) or event specific (e.g. event status is changed from ACTIVE→IDLE, e.g. since none of the players are eligible to participate in the feature operation). In order to reduce the load on feature service 250 handling the operation of the shared parcel, feature client API service 260 may be responsible for distributing the specific notification messages, such that feature service 250 is not required to track the connectivity of the players, thus avoiding the associated network overhead, allowing a faster possession iteration calculation. The feature widget clients 224 on the clients' devices 106 can display the received data on the clients' devices 106. In case a feature widget client 224 in the player's device received a specific message of the player associated with the client's device 106 of possession of the shared feature in the current iteration, the feature widget client 224 can further display possession information to the player. One exemplary display at the client's device 106 by feature widget client 224 can include a transition bar including data on the transition of the shared feature from one player to another. For example, the transition bar can include a timeline during which the shared feature is given to a certain player, some details of the given player that is in possession of the parcel, and the next time to transmit the shared feature to the next player.

At the end of the current possession iteration, i.e. when its duration has passed, feature service 250 can select a new eligible player 109, e.g. from the list of eligible players, to possess the shared feature, and can transmit to the players' devices 106 of the eligible players 109, data indicative of the new iteration, the iteration duration, and the new selection of an eligible player to possess the shared feature. When the pre-configured event duration has ended, feature service 250 can grant an award feature to an eligible player 109, that currently possesses the shared feature (block 350). Data indicative of the grant of the award can then be transmitted to the players' devices 106.

As mentioned above, in some examples, one or more criteria can be set to determine the eligibility of the players to participate in the shared feature, such as the player being active, or based on past actions of the player 107 in games 105. Hence, determining the eligibility of the players 107 can include determining, based on data received from RGS 103, whether the player 107 is playing a game 105 on RGS 103. If the player 107 meet the active gameplay criterion, then the player 107 is eligible to participate in the shared feature operation. Alternatively or additionally, feature service 250 can obtain data pertaining to past actions of the player 107, and to determine, based on the obtained data, whether the player meets other criteria, and is eligible or not.

In order to share the feature between the eligible players 109, in some examples, feature service 250 can divide the pre-configured event duration, e.g. the parcel's event duration, to a succession of possession iterations. Dividing the pre-configured event duration can be done by determining, based at least on the pre-configured event duration and a number of eligible players 109, a succession of possession iterations. The feature service 250 can, iteratively, indicate, for each of the possession iterations of the succession, one eligible player of the eligible players 109 as possessing the shared feature. The division of the event duration into a succession of iterations can be done e.g. in advance, before initiation of the shared feature event, based on the players that were determined to be eligible before initiating the event. Alternatively or additionally, in some examples, division into iterations can also be done during the event. In such examples, feature service 250 can determine the possession iterations based on the event duration, the time left until the end of the event duration, and a current number of eligible players 109. The possession iterations may include at least two possession iterations. Each possession iteration has a respective possession duration, which may be equal between all iterations, or may be diverse.

In some examples, feature service 250 can repeatedly determine, in real time, or near real time, during the pre-configured event duration, the eligibility of the plurality of players 107 playing the games 105, and/or the eligible players 109 that already participate in the shared feature operation. In some examples, the eligibility status of players 107 and eligible players 109 can be changed. Hence, a player 109 that was determined to be eligible, can be determined at a later point in time to be ineligible, and vice versa. As a result, the participation of players 107 and eligible players 109 in the shared feature operation can be changed due to a change in their eligibility status. In response to determining that a first player 107 that was determined to be ineligible, is now eligible, feature service 250 can facilitate participation of this first player 107 in the execution of the shared feature operation. Also, in response to determining that a second eligible player is now an ineligible player, feature service 250 can discontinue participation of the second ineligible player in the shared feature operation.

In some cases, in order to repeatedly determining the eligibility of players 107 or eligible players 109, feature service 250 can monitor, in real time, the activity of the players 107, e.g. based on connection info received from feature client API service 260 from player's device. In addition, feature service 250 can obtain data pertaining to past actions of players during the pre-configured event duration. For example, for each player 107 or eligible player 109, feature service 250 can repeatedly obtain, from wallet module 270, staking or deposit data, as described above. Based on the obtained data, feature service 250 can repeatedly determine the eligibility status of the players.

In some examples, the obtained data may be filtered according to a pre-defined criteria, by filtering one or more of the obtained past actions, before determining the eligibility status. Examples of pre-defined criteria have been described above. Feature service 250 can then determine eligibility based on the obtained data without the filtered data.

In some examples, the data obtained and used by feature service 250 to determine the eligibility status of a player may include past actions of the player during a pre-configured time before execution of the shared feature event, upon initiation of the current gameplay in game 105, during the current gameplay, or a combination thereof. Yet, in some examples, the data obtained and used by feature service 250 to repeatedly determine the eligibility status of a player that was already determined to be eligible, and that now participates in the shared feature operation, may be different, and may depend only upon the past actions of the player during the current gameplay. In these examples, once a player has been determined to be eligible, then the continuous determination of his eligibility status is dependent only upon his past actions in the current gameplay.

As mentioned above, in order to share the feature between the eligible players 109, in some examples, feature service 250 can divide the pre-configured event duration, e.g. the parcel's event duration, into a succession of possession iterations. Based at least on the pre-configured event duration and the number of eligible players 109, a succession of possession iterations can be determined. For each iteration, one eligible player 109 can be selected as possessing the shared feature, and data that pertains to the iterations, as well as to the eligible player 109 that possesses the shared feature, can be transmitted to clients' devices 106. If, due to the continuous determination of the eligibility status, feature services determines that the number of eligible players 109 has been changed, e.g. since one or more eligible players are now determined to be ineligible, or vice versa, feature services can determine a revised succession of iterations. The revised succession can be determined, based, at least, on the pre-configured event duration, optionally, the time that remains until the end of the event, and the changed number of eligible players 109. The revised succession can include at least two possession iterations, where, in each iteration, one eligible player will iteratively be selected to possess the shared feature. In some examples, the duration of the shared feature event or the remaining time can be divided by the number of eligible players, to receive an equal duration number of possession iterations.

In some examples, apart from the award feature that is granted to an eligible player that possesses the shared feature at an end of the pre-configured event duration, one or more interim award features can be granted to eligible players during the shared feature operation. For example, it can be determined that an award feature is granted at the end of the feature event, and three interim award features can be granted to eligible players during the shared feature operation. Feature service 250 can obtain the total number of interim award features, or the remaining number of interim award features for the feature event, and to determine the revised succession of possession iterations. Based at least on the pre-configured event duration and the number of available interim award features, feature service 250 can determine, for each of the available interim award features, a respective time, during the feature operation event, for granting the available interim award feature. At the respective time, feature service 250 can grant the interim award feature to an eligible player that possesses the shared feature.

In some examples, the possession iterations are not determined in advance from a current moment in time (initiation of the execution of the shared feature event or from the time it is determined during the event) until the end of the feature event, but each next possession iteration is dynamically determined during a current possession iteration. In such examples, the shared feature operation comprises a plurality of possession iterations, each possession iteration having respective related data. The related data comprises at least a possession duration and a plurality of eligible players participating in the possession iteration. Since feature service 250 repeatedly determines the eligibility status of players 107, at least some of the related data of a possession iteration is dynamically determined during the pre-configured event duration. For example, the related data can be determined based at least on the pre-configured event duration or the remaining time until the end of the feature event, and a current number of eligible players. Once the next possession iteration and its related data are determined, data on the next possession iteration can be transmitted to the clients' devices 106. In order to determine the related data, feature service 250 can, during execution of a current possession iteration of the plurality of possession iterations, determine related data that pertains to a next possession iteration. For example, feature service 250 can obtain the current number of eligible players 109 and the remaining time until end of the feature event, and the related data.

In cases where one or more interim award features can be granted to eligible players 109 during the shared feature operation, feature service 250 can obtain the total number of interim award features, or the remaining number of interim award features for the feature event, and to determine, based upon the obtained data, related data of a next possession iteration. Based at least on the pre-configured event duration and the remaining number of interim award features, feature service 250 can determine, for each of the remaining interim award features, a respective time, during the feature operation event, for granting the interim award features. At the respective time, feature service 250 can grant the interim award feature to an eligible player that possesses the shared feature.

In some cases, shared feature possession time and the transition time of the shared feature between the eligible players may be random, or may be determined based on the number of active players and their eligibility to receive the shared feature. In some examples, every eligible player has equal probability to receive the shared feature. Determining the shared feature possession iteration duration may be done using various formulas, for example (but not limited to): proportional manner to the number of active players: with an increasing number of players, the shared feature possession time decreases, so that more players may receive the shared feature, proportional to the time and available awards left: if an event has more than one award to grant, the possession time decreases, so that there are enough iterations to grant all awards. The formulas can be combined and overridden with minimum/maximum values e.g. to avoid unwanted scenarios (too long or short shared feature possession times). Also, in some examples, if the remaining time for the last possession is under a preconfigured minimum, then the penultimate possession may be extended to be the last one, for example: time left in event: 35 seconds; time determined for the next iteration: 20 seconds. In such cases, the next iteration would be extended to 35 seconds since the remaining time is below the pre-configured minimum (e.g. 20 seconds). In some examples, the above formula assists in providing uniform award distribution over the entire game event. For example, if there are a large number of prizes left for players to win, then the probability to win a prize is higher (and vice versa).

In some examples, feature service 250 can determine the display timing of granting an award at a client's device 106. The display of granting an award may include visual effects on the client's device 106. Feature widget client 224 may receive data from feature client API 260 pertaining to the timing to display the grant. If a player currently possesses the shared feature, the display timing indicates when the grant of an award will be displayed to the player. In some examples, the animation is displayed randomly during a timeframe of the feature possession iteration using normal distribution (e.g. on average, the grant of an award may be displayed in the middle of the parcel possession iteration). The timing display can be determined by combining a random function with a normal distribution function to enhance a significant portion of the grant of an award display close to the middle of the iteration.

Following are some exemplary gameflows for determining which awards to grant from an available pool of awards, and when to grant the award. In some examples, a random award is chosen from the list of possible awards, e.g. as determined by one or more licensees of games which agreed to operate the feature event. In some examples, the probability to win a specific award may be proportional to the total awards left. For example, if the total awards left in the list is 50, and the "X" awards left are 10, then the probability to win "X" award is 20% (=10/50). In some examples, a Feature Final Award pertaining to the award granted at the end of the feature event, may be predetermined. If there are no eligible players during the last possession iteration, the event ends without granting the final award. If an explicit final award has not been configured, one of the awards from the pool may be reserved as an award to be granted in the last possession iteration. A final award flow may include one or more of the following stages: if a final award is configured, then a final award is guaranteed to be given out in the final iteration. In some examples, configuring a final award may be granted even if some available awards were left in the pool of awards (e.g. in cases where the event was in IDLE status, and not all awards were granted during the event). In some examples, if a final award is not configured, one award from the award pool may be kept for the final iteration. In cases where there are more than 1 award in the pool during the final iteration, then the same proportional formula as described above may be used (i.e. event was in IDLE status and not all awards were given out during the event).

In some examples, a pending award may be stored, for example, if there was an award grant in current possession iteration, and the player has not acknowledged the award. This feature may be advantageous, since it is expected that the player will see the award grant animation display before the actual award becomes available to the player (e.g. player receives bonus funds for gameplay). For example, in cases of network connectivity problems, the player can reopen the game, and any pending awards are retrieved from the server-side storage, so that Feature Widget client 224 can display the grant animation.

It should be noted that repeatedly determining, in real time, the activity of the player 107, may involve tracking in real-time data, simultaneously, between players in different geographical areas, while considering different connectivity criteria, frequent changes in players' statuses, and then operating the shared features in real time, or near real time, between the players who were determined to be eligible to operate the shared feature. The operation should be done in a manner such that the eligible players 109 can receive notifications pertaining to the shared feature, and can participate in the shared feature operation in the same manner, and optionally view the same feature operation, all in a simultaneous manner. From the gaming system's end, in some cases, intensive computational processing time is required from aggregation platform 101, in order to operate the shared feature and determine data which pertains to possession iterations, the current eligible players, who is the next player to receive the shared feature etc. For example, system load or network latency can affect the duration of the processing time. If feature service 250 initiates the process of determining the related data of the next possession iteration only when the current possession iteration ends, by the time that it finishes the process and transmits the related data to the clients' devices 106, the data would have been displayed on the players' devices 106 with a delay, which would have affected the experience and operation of the shared feature in real time. Therefore, in order to achieve operation in real time or near real time, and reduce delays in the display at the client's side, in some examples, processing of a feature possession iteration starts at a certain time beforehand, e.g. 10 seconds before the current possession iteration ends. Feature service 250 may calculate an estimated processing time that pertains to determining the related data of the next possession duration. Based on the estimated processing time, feature service 250 can initiate the process of determining the related data before the end of the current possession time, thereby facilitating near real-time feature operation execution. Bringing forward the processing, before the current iteration ends, is advantageous, since it enables feature service 250 to complete the processing time before the iteration ends, and to transmit data indicative of the processing, e.g. the next player to receive the shared feature, to all players' devices 106, before the end of the iteration. The data itself transmitted to the player's device 106 will include data that considers the processing time. To illustrate, if server-side calculation starts 10 seconds before the next iteration starts, and processing time was calculated to take 2 seconds, then the suitable notification to be sent to the clients' device 106 will include that there are 8 seconds left for current possession iteration. In such a manner, display of the possession iteration, including e.g. a transition bar in players' devices 106, can be identical or almost identical when the next iteration begins. A predefined safe baseline of processing of 10 seconds before the end of the iteration, is an example only, and any other certain time interval can be defined, where, optimally, the interval should be as short as possible, and close to the start of the next possession time, in order to achieve the nearest real time processing. In some examples, the exemplary 10 seconds can be dynamically computed and reduced (or increased) during an on-going feature event, based on one or more of criteria, or a combination thereof. As mentioned, the load of the system can be used as a criterion for determining the processing time. By measuring system key performance indicators, it is possible to predict how much time it will take to calculate the next possession iteration related data. For example, the key indicators can be CPU usage, memory usage, and number of active players and their betting behavior. In addition, the mean network latency between feature service 250 and feature widget client 224 can also be used as a criterion for determining the processing time. By measuring the network quality of connected players, it is possible to deduce how long it will take to transmit data to the client's end. By combining one or more of the above-mentioned measurements, it is possible to calculate the optimum time to start the next possession, so that near real-time user experience is consistent for most of the players.

Figure 4:
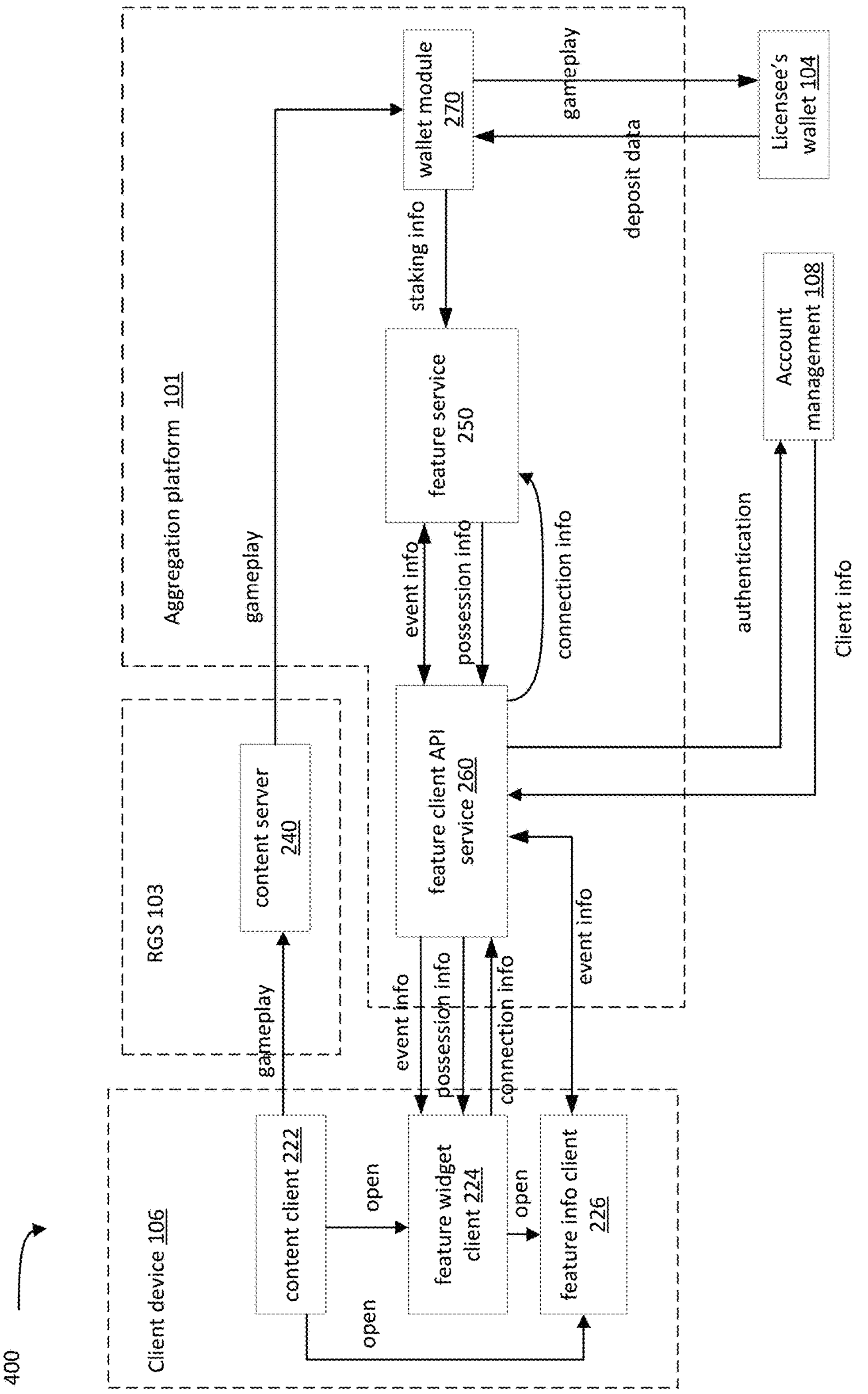
FIG. 4 illustrates an exemplary overview of a game flow 300, between entities in computerized gaming environment 100 of FIG. 1 and components of aggregation platform 101 and client device 106.

In order to further explain the above, reference is now made to FIG. 4 illustrating an exemplary overview of a game flow 400, between entities in computerized gaming environment 100 of FIG. 1 and components of aggregation platform 101, RGS 103 and client device 106. It should be noted that FIG. 4 illustrates an exemplary operation of a shared feature of a parcel type, and should not be considered as limiting. In some examples, game flow begins by receiving from a player 107 an input on content client 222 in client's device 106. Such an input can be a request to start a gameplay of game 105 on RGS 103. If the game 105 is associated with a shared feature operation, e.g. of a parcel type, the gameplay input can trigger also the initiation of the parcel operation at the player's device 106, e.g. by operating the widget at the player's device 106 and sending connection data to feature service API service 260.

In response to receiving the gameplay input, feature widget client 224 can communicate connection info to feature client API service 260 on operation of the widget at the player's device. The data may be communicated to feature service 250 which may determine that the player 107 is active. Feature info client 226 may also communicate data to feature client API service 260 e.g. if the player selected a feature event in which he wishes to participate. The data may be communicated to feature service 250 to operate the selected feature event. During gameplay of a player, feature widget client 224 can repeatedly communicate connection info to feature client API service 260 to indicate whether the widget on the player's device is still active.

In addition, in response to receiving the gameplay input, content client 222 may communicate the gameplay input to content server 240 at RGS 103. Content server 240 may transmit the gameplay input to wallet module 270 in PMC 210, which may communicate with the licensee's wallet 104 to receive data on the player's activity. External licensee's wallet 104 may confirm/deny player's placed bets, and may send deposit data back to wallet module 270. In response to receiving deposit data by wallet module 270, wallet module 270 communicates with feature service 250. Based on the data received from wallet module 270, feature service 250 can determine whether a player has met the required staking conditions/deposit criteria.

In some examples, in order to repeatedly determine the eligibility status of players during the parcel event, feature service 250 may monitor both the activity status of the players, as well as determine if they meet the other monetary criteria. For example, feature service 250, through feature client API service 260 may keep mapping connected feature widget clients 224, e.g. by monitoring those players that are active, based on connection info sent by feature widget clients 224. The mapping may be updated at regular intervals until a disconnection event is detected, e.g. when connection between feature widget clients 224 disappears. In response to loosing the connection with the feature widget clients 224, feature client API service 260 will transmit connection info to feature service indicative that the player is no longer active. There may be set a further several minute buffer, e.g. a 2 minute buffer, to allow short disconnections from the feature widget client 224 end. The source of disconnections may be, for example (but are not limited to), technical disconnection (e.g. mobile device switching from one mobile cellular tower to another), or activity disconnection (e.g. a player navigating from one game 105 to another). One purpose of connectivity mapping is to validate whether players are able to see data which pertains to feature operation on client's device 106 for near real-time engagement flows. In cases where the feature event is associated with more than one game 105 at the player's device 106, there may be a scenario where a player played in one game and then decided to switch to another game, where both of the games are associated with the same feature event. Hence, despite the fact that the player disconnected from the first game, based on his play in the second game and the association of the second game to the same feature event, feature widget client 224 may still transmit connection info indicative on activity of the player 107 and the active operation of the widget to feature client API service 260.

In addition, the eligibility of active players to receive the parcel is also monitored and determined, e.g. based on staking/deposit criteria, as explained above. Hence, feature service 250 may repeatedly receive, in real time, data from wallet module 270, with the assistance of licensee's wallet 104 when required. Based on the received data, feature service may repeatedly determine the eligibility status of the plurality of players.

As shown by 'event info' and 'possession info' arrows from feature service 250 to feature client API service 260, and from feature client API service 260 to feature widget client 224, decisions made by feature service 250 are communicated by feature client API service 260 to client's device 106. Also, 'event info' arrow from feature client API service 260 to feature info client 226 illustrate the transmission of data on one or more feature events such as currently on-going or upcoming feature events to feature info client 226, to be displayed at client's device 106. As explained above, the notifications sent from feature client API service 260 to feature widget client 226 may include data that considers processing time to have seamless transitioning animation on the client-side. For example, a notification may be sent with regard to the early possession start, before the current possession iteration ends.

In some cases, in order to improve the user experience, smooth operation of the gaming system and avoidance of animation delays at the client's device, due to network traffic between the client and server-side components, pending receipt of the eligibility status determination of feature service 250, i.e., whether a player is eligible for receiving the shared feature, feature widget client 224 performs some actions on the client's device, irrespective of the eligibility status of the player. In such cases, feature widget client 224 may track a player's staking activity at the time of execution, e.g. based on data received from content client 222, in order to determine interim eligibility status. In cases where feature widget client 224 determines that the player is eligible, data indicative of the eligibility is displayed to the player. Tracking of the player's current staking at the client side may be done in addition to tracking done by the feature service 250 at the server's end. In some examples, feature widget client 224 determines the eligibility status as a client-side decision, if the player fulfils one or more of the eligibility criteria (such as accumulated deposit and the staking criteria described above), and/or some additional eligibility criteria determined at the client's side, such as a current bet amount. Feature widget client 224 may display eligibility data to the player. If, for some reason, the player is eventually determined by the feature service 250 to be ineligible, e.g. since his bet was rejected by the licensee's wallet 104, the client-side determination, as made by feature widget client 224, is reverted, and, accordingly, the player's status is changed to be ineligible. Accordingly, feature widget client 224 may display suitable ineligibility data to the player.

In some examples, the feature event is pre-configured with filters to avoid feature widget client's 224 interim determination, until receiving confirmation from the feature service 250 at the server's end. In such examples, the client-side determination may be skipped, and the player is marked as eligible by the feature widget client 224 only after receiving confirmation of eligibility from the feature service 250. Determining the eligibility of a player at a player's end may be advantageous, as it is assumed that in most cases, such filtering is unnecessary, thus a seamless user experience will be impaired in the minority of cases.

Feature widget client 224 may determine the eligibility from the client's side, based on predefined criteria for eligibility (e.g. as defined in the active game event), data on fulfillment of the criteria of the specific player (e.g. as received from feature service 250), data which pertains to the current activity of the player, e.g. the current bet placed by the player (e.g. as received from the content client 222), or a combination of the above. In some examples, the predefined criteria for eligibility may include predefined accumulated deposit and staking thresholds for granting eligibility to receive the shared feature. The accumulated deposit and staking criteria may be determined by the feature service 250, and data indicative of a given player meeting these criteria may be sent to the feature widget client 224. The accumulated deposit criteria and staking criteria may be one-time criteria, and once they are fulfilled by a given player, and the player is marked as having fulfilled these accumulated criteria, the status of the player cannot be reverted back to ineligible again.

In some examples, an additional criterion for feature widget client 224 to determine the eligibility of a player may include a current bet staking threshold, e.g. a staking activity threshold limited by time. The predefined criterion may be defined by the game event and may be provided by feature service 250 to the feature widget client 224, e.g. when a new game event starts. During the game event, feature service 250 may update the feature widget client whether the player has fulfilled the accumulated deposit and staking criteria. Based on the current bet placed by a player, data of which may be received from content client 222, feature widget client 224 may determine whether the current bet staking threshold is also fulfilled, e.g. by comparing the current bet amount to the predefined criterion. Depending on the data received from feature service 250 on a player fulfilling the accumulated criterion, and determining that the current bet meets the current staking threshold, feature widget client 224 may determine that the player is eligible for receiving the shared feature. In response to determining eligibility, feature widget client 224 may communicate respective data to the player by displaying data indicative of eligibility of the player. It should be noted that data on fulfillment of the accumulated criteria may be sent from feature server 250 periodically, after each bet is placed by the player, when the player has met the criteria, in a random manner, or in any other determined frequency, on data notifications between the Feature Server and the Feature client elements.

Detailed below is an example of data received by the feature widget client 224, based on which the feature widget client 224 may determine the eligibility of the player to receive the shared feature, before receiving an eligibility indication from the feature service 250:

1. Criteria for eligibility received from feature service 250 for a game event, and data on fulfillment of the player of the criteria:
    1. Deposit criteria as predetermined by game event: 10.00 EUR, fulfilled: true (as received by feature service 250)
    2. Staking criteria as predetermined by game event: 5.00 EUR, fulfilled: true (as received by feature service 250)
    3. Staking activity criteria as predetermined by game event: 30 seconds, 0.50 EUR, fulfilled: false (as received by feature service 250)
2. Data on current staking activity, based on current bet placed by the player and received from content client 222:
    1. Player has placed a new bet of 1.50 EUR.

Note that the data on fulfillment of criteria is individual per player, since each player has to individually fulfill the eligibility criteria. Accumulated deposit criteria and staking criteria are one-time criteria, and, once they are fulfilled, as indicated by feature service 250, the status cannot be reverted back to 'fulfilled: false'. Hence, since the accumulated thresholds for deposit and staking are fulfilled, feature widget client 224 may determine eligibility based on the current new bet placed by the player. Feature widget client 224 may compare the current bet to a predefined current bet staking threshold. If the bet placed by the player is higher than the threshold, feature widget client 224 determines that the player is eligible for receiving the shared feature. Note that eventually the determination that the player is eligible from "Staking activity criteria" will be sent also from feature service 250 via feature client API service 260 to the feature widget client 224. As explained above, in case the current bet is rejected for any reason, the client-side decision is reverted, and e.g. the animation display of the widget in client's device 106 is reverted back to 'not eligible' state.

It should be noted that dividing the criteria for eligibility to accumulated criteria and current criteria is advantageous in terms of computational resources and latency. Since the criteria was divided and part of the determination is done at a client side, latency, e.g. due to connectivity and time for data transmission in the system, is reduced, and hence performance of the gaming system may be improved. In addition, in order to even further improve computational resources and latency, in some examples, the client-side decision from 'staking activity criteria' may be triggered if only all other eligibility criteria are fulfilled.

Figure 5:
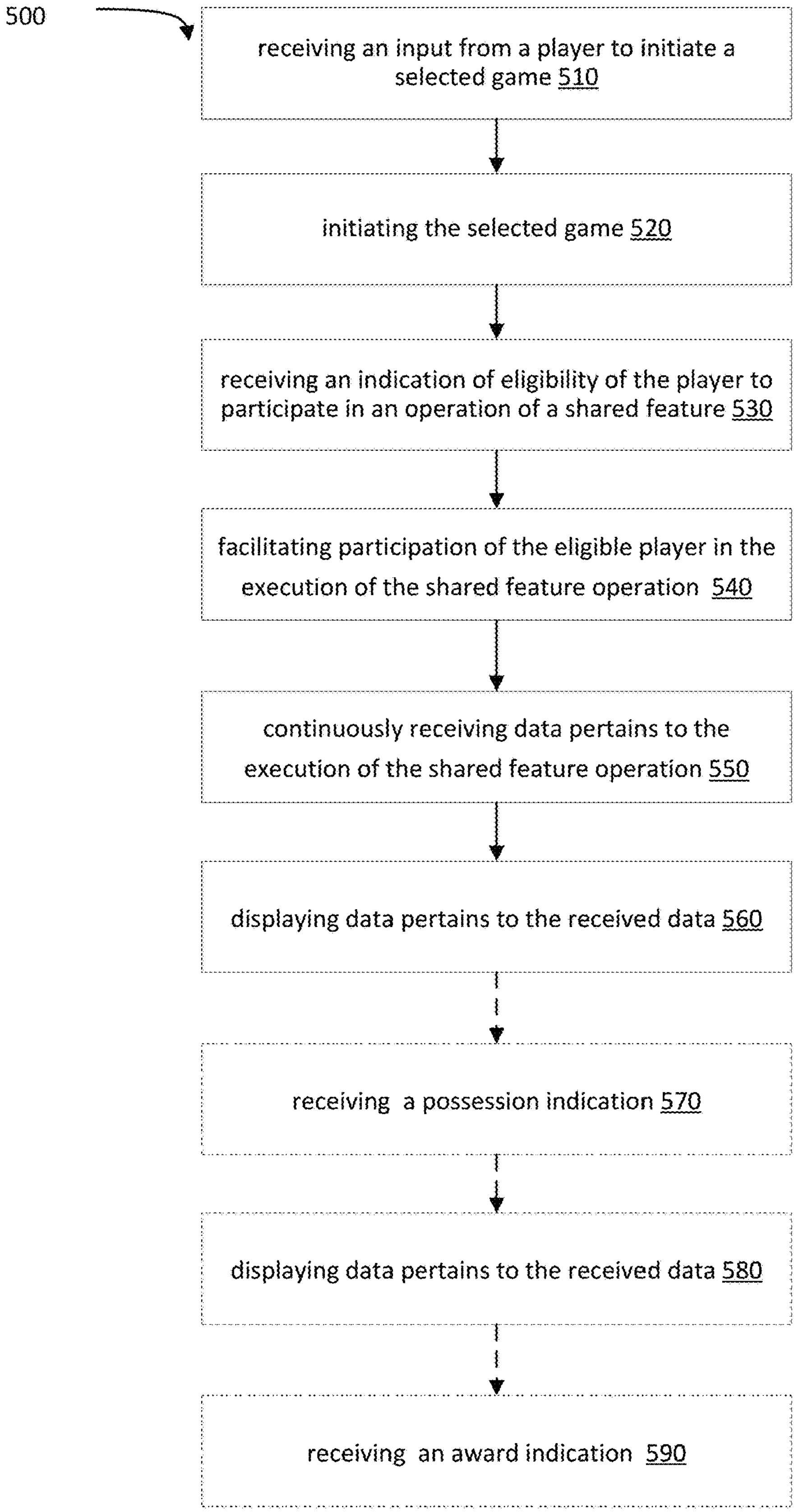
FIG. 5 illustrates a generalized flow-chart of operations performed by client's device 106 in accordance with certain embodiments of the presently disclosed subject matter.

Reference is now made to FIG. 5 illustrating a generalized flow-chart of operations performed by client's device 106 in accordance with certain embodiments of the presently disclosed subject matter. Therefore, in some cases, on a player's device 106, there is provided a computerized method of facilitating participation in a feature operation executed in a game, in a computerized environment described above with respect to FIG. 1 including an aggregation platform 101 operatively communicating with at least one RGS 103, hosting at least one game 105 to be provided to a plurality of players through players' devices. Client devices may comprise a client processor and memory circuitry (client PMC) comprising a client processor and a client memory (not shown in FIG. 1). The client processor is configured to execute several functional modules in accordance with computer-readable instructions implemented on a non-transitory computer-readable storage medium e.g. client memory. Such functional modules are referred to hereinafter as comprised in the client processor. The client processor can comprise content client 222, feature widget client 224 and feature info client 226 as described above. The client processor may receive an input from a player 107 operating the player's device 106, where the input includes a selection of a game from the at least one game hosted by the RGS 103. The selection can include a request to initiate an execution of the selected game (block 510). In response to the selection, client processor can initiate the selected game (block 520), and the player 107 may start playing the game selected by him. Client processor may receive, in real time, an indication, from the aggregation platform 101 of eligibility of the player 107, to participate in an operation of a feature shared between the plurality of players (block 530). The operation of the shared feature has been described above. Client processor may facilitate participation of the player in the execution of the shared feature operation (block 540). The client processor can facilitate the operation of the shared feature by repeatedly receiving from the aggregation platform data which pertains to execution of the shared feature operation (block 550). The received data can indicate a current player of the plurality of players that possesses the shared feature for a current possession iteration having a respective current possession duration. In response to receiving the data, client processor can display the data on the client's device 106 (block 560).

In some examples, client processor receives from the aggregation platform 101 a possession indication of the player playing the game as possessing the shared feature for a possession iteration having a respective possession duration (block 570). In response to receiving the possession iteration, client processor can display data indicative of the possession indication for the respective possession duration (block 580). If the player possesses the shared feature by the end of the pre-configured event duration, an award indication is received from the aggregation platform 101 of an award granted to the player (block 590).

As described above, in order to achieve smooth operation and avoid display delay at the client's end, in some examples, along with receiving the player's selection of a game, client processor can receive an indication of a monetary action performed by the player, e.g. by content client 222, in the selected game. For example, the client processor can receive an indication that the player placed a bet of a certain amount. Client processor can determine, based on the received indication, the eligibility of the player to participate in the shared feature operation, and display data pertaining to the eligibility to the player. Client processor can then receive, in real time, from the aggregation platform 101, e.g. as determined by feature service 250 above, an eligibility indication of eligibility or ineligibility of the player to participate in the shared feature operation. The eligibility determination by feature service 250 has been described above. If the player, that is currently indicated by the client processor as eligible, is also determined by the feature service 250 to be eligible, and the indication received from the aggregation platform 101 includes such an indication, then client processor can facilitate the participation of the eligible player in the execution of the shared feature operation. If the player is, however, determined to be ineligible by the feature service 250, then client processor discontinues participation of the ineligible player in the shared feature operation.

Figure 6:
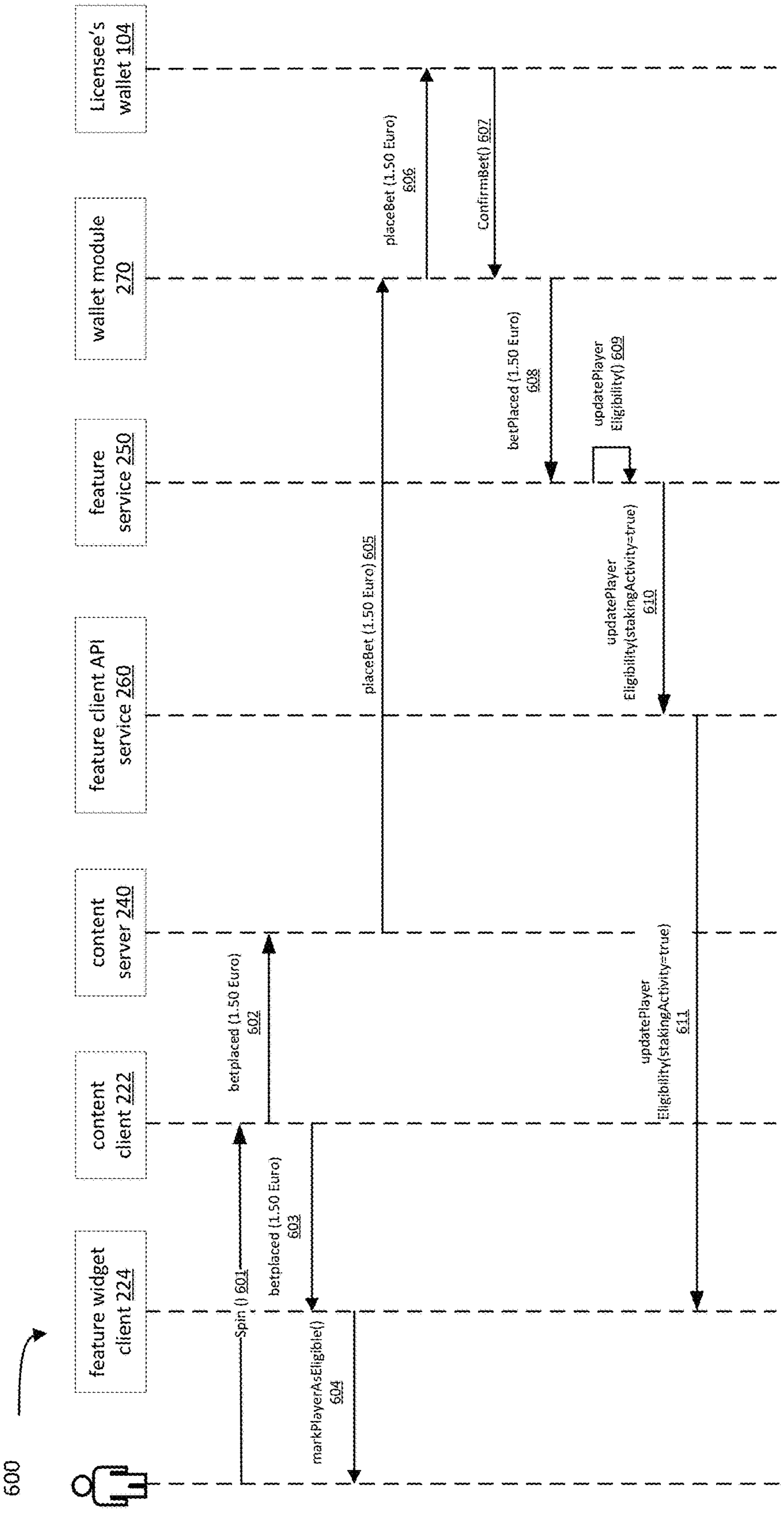
FIG. 6 illustrates an exemplary overview of a tracking flow 500 in accordance with certain embodiments of the presently disclosed subject matter.

Reference is now made to FIG. 6 illustrating an exemplary overview of a tracking flow 600 in accordance with certain embodiments of the presently disclosed subject matter. The operations are illustrated on an exemplary game of roulette where the player initiates the gameplay by a spin (block 601). The data is received by content client 222. Along with or after the spin of the player, the player also places a 1.5 Euro bet (block 602), and data on the placed bet is received by content client 222 and is transmitted to content server 240 in RGS 103. Simultaneously or after transmitting the data to content server 240, content client 222 transmits, to feature widget client 224, data indicative of the placed bet (block 603). Feature widget client 224 marks the player as eligible to participate in the shared feature operation (block 604).

Irrespective of the determination and actions of the feature widget client 224, data on the placed bet is transmitted to wallet module 270 (block 605), which may assist licensee's wallet 104 (block 606). Licensee's wallet 104 may reply with data which pertains to the bet placed by the player (i.e., may deny or accept). As exemplified, confirmation on the placed bet is sent to wallet module 270 (block 607) and is transmitted accordingly to feature service 250 (block 608). Feature service 250 updates the eligibility status of the player (block 609) and may transmit eligibility data to feature client API service 260 (block 610). Feature client API service 260 then transmits eligibility data to feature widget client 224 (block 611). In such a case, the eligibility status of the player remains the same.

It is noted that, as is well known in the art, systems operating in real time may experience some delay between the onset of a command and its execution, due to various reasons such as processing time and/or network communication delay. The term real-time as used herein is meant to include near real-time i.e., operation in systems that may experience some internal delays.

It is noted that the teachings of the presently disclosed subject matter are not bound by the flow chart and data flow illustrated in FIGS. 3-6, and that the illustrated operations can occur out of the illustrated order. For example, operations <520> and <530>, shown in succession, can be executed substantially concurrently, or in the reverse order.

Also, it is noted that the teachings of the presently disclosed subject matter are not bound by the flow charts and game flows illustrated in the figures, and that the illustrated operations can occur out of the illustrated order. It is also noted that whilst the flow chart is described with reference to elements of the gaming system and the aggregation platform 101, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the computerized method of the invention. The invention further contemplates a non-transitory computer-readable memory tangibly embodying a program of instructions executable by the computer for executing the computerized method of the invention.

Those skilled in the art will readily appreciate that various modifications and changes can be applied to the embodiments of the invention as hereinbefore described without departing from its scope, defined in and by the appended claims.

The invention claimed is:

1. A computerized method of facilitating participation in a feature operation executed in a game, comprising:

providing an aggregation platform operatively communicating with at least one remote game server (RGS), the at least one RGS hosting at least one game to be provided to a plurality of players through players' devices, by a processor of the aggregation platform:

determining, in real time, eligibility of at least two eligible players of the plurality of players to participate in an operation of a feature shared between the at least two eligible players for a pre-configured event duration, wherein the shared feature operation is executed separately from the at least one hosted game and when the at least one host game is played by the at least two eligible players; and facilitating participation of the at least two eligible players in the execution of the shared feature operation, comprising:

iteratively selecting one eligible player of the eligible players, as possessing a shared feature for a possession iteration having a respective possession duration, the possession duration shorter than the pre-configured event duration; and granting an award feature to an eligible player, that possesses the shared feature, at an end of the pre-configured event duration, wherein, the shared feature operation comprises a plurality of possession iterations, each possession iteration having a respective related data, the related data comprising at least a possession duration and a plurality of eligible players participating in the possession iteration, and wherein at least part of the related data of at least one or more of the possession iterations is dynamically determined during the pre-configured event duration, based at least on the pre-configured event duration and a current number of eligible players, and also based on an obtained number of remaining interim award features, wherein interim award features are granted to eligible players during the shared feature operation, the computerized method further comprising:

during execution of a current possession iteration of the plurality of possession iterations, determining related data that pertains to a next possession iteration; and based on the determined related data, indicating one eligible player as possessing the shared feature in the next possession iteration for the determined next possession duration.

2. The computerized method of claim 1, wherein determining, in real time, eligibility of a player of the plurality of players comprises:

determining an active status of the player; and in response to determining that the player has an active status, determining that the player is eligible.

3. The computerized method of claim 1, wherein determining, in real time, the eligibility of a player of the plurality of players, comprises:

obtaining data pertaining to past actions of the player over a pre-defined period of time; and determining the eligibility of the player based at least on the obtained data.

4. The computerized method of claim 1, wherein facilitating the participation further comprises:

determining, based at least on the pre-configured event duration and a number of eligible players, a succession of at least two possession iterations, each possession iteration having a respective possession duration; and iteratively indicating, for each determined possession iteration of the succession, one eligible player of the eligible players as possessing the shared feature for the respective possession duration.

5. The computerized method of claim 1, further comprising:

repeatedly determining, in real time, during the pre-configured event duration, the eligibility of at least two eligible players of the plurality of players;

in response to determining that a player that was determined to be ineligible, is eligible, facilitating participation of the eligible player in the execution of the shared feature operation; and in response to determining that an eligible player is an ineligible player, discontinue participation of the ineligible player in the shared feature operation.

6. The computerized method of claim 5, wherein facilitating the participation further comprises:

determining, based at least on the pre-configured event duration and a number of eligible players, a succession of at least two possession iterations, each possession iteration having a respective possession duration; and iteratively indicating for each determined possession iteration of the succession, one eligible player of the eligible players as possessing the shared feature for the respective possession duration;

the computerized method further comprising:

determining that the number of eligible players has been changed;

determining, based at least on the pre-configured event duration and the changed number of eligible players, a revised succession of at least two possession iterations; and iteratively selecting, for each determined possession iteration of the revised succession, one eligible player of the eligible players as possessing the shared feature for the respective possession duration.

7. The computerized method of claim 6, further comprising:

obtaining a number of available interim award features, wherein interim award features are granted to eligible players during the shared feature operation; and determining the revised succession based also on the obtained number of available interim award features.

8. The computerized method of claim 5, wherein repeatedly determining the eligibility of a player of the plurality of players, comprises, for a player of the plurality of players:

obtaining data pertaining to past actions of the player during the pre-configured event duration; and determining the eligibility of the player based at least on the obtained data.

9. The computerized method of claim 8, further comprising:

filtering, according to a pre-defined criterion, at least one past action; and repeatedly determining the eligibility based on the obtained data without the at least one filtered past action.

10. The computerized method of claim 1, further comprising:

calculating a processing time that pertains to determining the related data of the next possession duration; and initiating determining the related data that pertains to the next possession duration, based on the calculated processing time, thereby facilitating near real-time feature operation execution.

11. The computerized method of claim 10, wherein calculating the processing time is based on one or more of system load, network latency, a number of active players, past actions of the active players, or a combination thereof.

12. The computerized method of claim 1, further comprising:

based at least on the pre-configured event duration and a number of available interim award features, determining, for each of the available interim award features, a respective time, during the feature operation, for granting an available interim award feature; and at the respective time, granting the interim award feature to an eligible player that possesses the shared feature.

13. A computerized system of facilitating participation in a feature operation executed in a game, the system comprising a processing and memory circuitry (PMC) configured to:

provide an aggregation platform operatively communicating with at least one remote game server (RGS), the at least one RGS hosting at least one game to be provided to a plurality of players through players' devices, by a processor of the aggregation platform:

determine, in real time, eligibility of at least two eligible players of the plurality of players to participate in an operation of a feature shared between the at least two eligible players for a pre-configured event duration, wherein the shared feature operation is executed separately from the at least one hosted game and when the at least one host game is played by the at least two eligible players; and facilitate participation of the at least two eligible players in the execution of the shared feature operation, comprising:

iteratively select one eligible player of the eligible players, as possessing a shared feature for a possession iteration having a respective possession duration, the possession duration shorter than the pre-configured event duration; and grant an award feature to an eligible player, that possesses the shared feature, at an end of the pre-configured event duration, wherein the shared feature operation comprises a plurality of possession iterations, each possession iteration having a respective related data, the related data comprising at least a possession duration and a plurality of eligible players participating in the possession iteration, and wherein at least part of the related data of at least one or more of the possession iterations is dynamically determined during the pre-configured event duration, based at least on the pre-configured event duration and a current number of eligible players and also based on an obtained number of remaining interim award features, wherein interim award features are granted to eligible players during the shared feature operation, wherein the method further comprising:

during execution of a current possession iteration of the plurality of possession iterations, determining related data that pertains to a next possession iteration; and based on the determined related data, indicating one eligible player as possessing the shared feature in the next possession iteration for the determined next possession duration.

14. A non-transitory computer readable storage medium tangibly embodying a program of instructions that, when executed by a computer, cause the computer to perform a method of facilitating participation in a feature operation executed in a game, comprising:

providing an aggregation platform operatively communicating with at least one remote game server (RGS), the at least one RGS hosting at least one game to be provided to a plurality of players through players' devices, by a processor of the aggregation platform:

determining, in real time, eligibility of at least two eligible players of the plurality of players to participate in an operation of a feature shared between the at least two eligible players for a pre-configured event duration, wherein the shared feature operation is executed separately from the at least one hosted game and when the at least one host game is played by the at least two eligible players; and facilitating participation of the at least two eligible players in the execution of the shared feature operation, comprising:

iteratively selecting one eligible player of the eligible players, as possessing a shared feature for a possession iteration having a respective possession duration, the possession duration shorter than the pre-configured event duration; and granting an award feature to an eligible player that possesses the shared feature, at an end of the pre-configured event duration, wherein the shared feature operation comprises a plurality of possession iterations, each possession iteration having a respective related data, the related data comprising at least a possession duration and a plurality of eligible players participating in the possession iteration, and wherein at least part of the related data of at least one or more of the possession iterations is dynamically determined during the pre-configured event duration, based at least on the pre-configured event duration and a current number of eligible players and also based on an obtained number of remaining interim award features, wherein interim award features are granted to eligible players during the shared feature operation, wherein the method further comprising:

during execution of a current possession iteration of the plurality of possession iterations, determining related data that pertains to a next possession iteration; and based on the determined related data, indicating one eligible player as possessing the shared feature in the next possession iteration for the determined next possession duration.

15. On a player's device, a computerized method of facilitating participation in a feature operation executed in a game, comprising:

in an aggregation platform operatively communicating with at least one remote game server (RGS), the at least one RGS hosting at least one game to be provided to a plurality of players through players' devices, by a processor of the player's device:

receiving an input from a player operating the player's device to initiate an execution of a selected game from the at least one game;

initiating the selected game;

receiving, in real time, an indication from the aggregation platform of eligibility of the player to participate in an operation of a feature shared between the plurality of players for a pre-configured event duration, wherein the shared feature operation is executed separately from the selected game and when the selected game is played by the player, and includes iteratively selecting one eligible player of the eligible players, as possessing a shared feature for a possession iteration having a respective possession duration, the possession duration shorter than the pre-configured event duration, wherein an award is granted to an eligible player that possesses the shared feature, at an end of the pre-configured event duration, wherein the shared feature operation comprises a plurality of possession iterations, each possession iteration having a respective related data, the related data comprising at least a possession duration and a plurality of eligible players participating in the possession iteration, and wherein at least part of the related data of at least one or more of the possession iterations is dynamically determined during the pre-configured event duration, based at least on the pre-configured event duration and a current number of eligible players and also based on an obtained number of remaining interim award features, wherein interim award features are granted to eligible players during the shared feature operation, wherein during execution of a current possession iteration of the plurality of possession iterations, determining related data that pertains to a next possession iteration; and based on the determined related data, indicating one eligible player as possessing the shared feature in the next possession iteration for the determined next possession duration; and facilitating participation of the player in the execution of the shared feature operation, comprising:

repeatedly receiving from the aggregation platform data which pertains to the execution of the shared feature operation, the data indicative of a current player of the plurality of players that possesses the shared feature for a current possession iteration; and displaying data which pertains to the received data.

16. The computerized method of claim 15, the computerized method further comprising:

receiving from the aggregation platform a possession indication of the player as possessing the shared feature for a possession iteration having a respective possession duration;

displaying data indicative of the possession indication for the respective possession duration; and in response to possessing the shared feature by the player, at an end of the pre-configured event duration, receiving an award indication from the aggregation platform of an award granted to the player.

17. The computerized method of claim 15, wherein receiving the input from the player further comprises receiving indication of a monetary action performed by the player, the computerized method further comprising:

determining, based on the received indication, the eligibility of the player to participate in the shared feature operation, and displaying data pertaining to the eligibility;

receiving, in real time, from the aggregation platform, an eligibility indication of eligibility or ineligibility of the player to participate in the shared feature operation;

in response to the player being eligible to participate in the shared feature operation, facilitating the participation of the eligible player in the execution of the shared feature operation; and in response to the player being ineligible to participate in the shared feature operation, discontinuing participation of the ineligible player in the shared feature operation.

* * * * *